United States Patent [19]

Tanaka

[11] Patent Number: 5,635,703
[45] Date of Patent: Jun. 3, 1997

[54] CARD STORAGE MEDIUM HAVING A MULTI-APPLICATION SUPPORT FUNCTION

[75] Inventor: Hiroshi Tanaka, Kawasaki, Japan

[73] Assignee: Fujitsu Limited, Kawasaki, Japan

[21] Appl. No.: 535,954

[22] Filed: Sep. 28, 1995

[30] Foreign Application Priority Data

Mar. 20, 1995 [JP] Japan ................................. 7-060911

[51] Int. Cl.$^6$ ........................................... G06K 19/06
[52] U.S. Cl. .................... 235/492; 235/487; 235/380; 902/4; 395/730; 395/732; 395/601
[58] Field of Search ........................... 235/492, 487, 235/380, 382, 441; 902/4, 26; 395/600, 730, 732

[56] References Cited

U.S. PATENT DOCUMENTS

| 4,748,320 | 5/1988 | Yorimoto et al. | 235/492 |
| 5,014,192 | 5/1991 | Mansfield et al. | 364/200 |
| 5,408,082 | 4/1995 | Takagi et al. | 235/492 |
| 5,506,397 | 4/1996 | Hashino | 235/492 |
| 5,517,014 | 5/1996 | Iijima | 235/492 |

FOREIGN PATENT DOCUMENTS

| 0 262 025 | 3/1988 | European Pat. Off. . |
| 0 569 131 | 11/1993 | European Pat. Off. . |
| 0 617 387 | 9/1994 | European Pat. Off. . |
| 0636998 | 2/1995 | European Pat. Off. . |
| 0 636 998 | 2/1995 | European Pat. Off. . |

*Primary Examiner*—Donald T. Hajec
*Assistant Examiner*—Michael G. Lee
*Attorney, Agent, or Firm*—Armstrong, Westerman, Hattori, McLeland & Naughton

[57] ABSTRACT

A card storage medium accessible from several applications simultaneously has a storage unit, a communication control unit and a file access control unit. The communication control unit includes a command multiplex reception control unit for accepting a command on occasion received from the outside, while successively requiring the file access control unit to perform a command process according to the command accepted. The file access control unit includes an access exclusive control unit for inhibiting access to a file unit that is an object of a command process required by the command multiplex reception control unit if the file unit is already an object of an access for another command process. The card storage medium of this invention may be adapted to an IC card or an optical card which is necessary to comply with diversification or sophistication of users' demands.

12 Claims, 13 Drawing Sheets

PRIOR ATR

CARD STORAGE MEDIUM HAVING A MULTI-APPLICATION SUPPORT FUNCTION

BACKGROUND OF THE INVENTION

1. Field of the Invention

The present invention relates to a card storage medium such as an IC card, an optical card, etc. used as a cashless card, an ID card, a health management card, a local government service card, etc. More specifically, the present invention relates to a card-type storage medium having a multi-application support function enabling accesses from several applications to a file stored therein.

2. Description of the Related Art

An IC card (a card storage medium) 100 has, in general, a microprocessor unit (MPU) 101 and a storage (a file area; an EPROM/EEPROM, for example) 102 therein, and is connected to a transaction apparatus (an external apparatus), not shown, through a terminal unit 103, as shown in FIGS. 16 and 17.

The storage 102 has a data area in which data files are retained, and a directory area in which control information (pointers, etc.) about data files in the data area is retained. The MPU 101 manages the data files in the data area in the storage 102 on the basis of the control information in the directory area.

If the MPU 101 receives an access command through the terminal unit 103 from the external transaction apparatus, for example, the MPU 101 performs a read process (a read access), a write process (a write access), an erase process (an erase access), a rewrite process (a rewrite access) or the like on the storage 102 according to the access command.

In the MPU 101, there is provided a RAM 101B used as a work area when a control operation is performed, in addition to a RAM 101A for retaining a program used to perform the control operation. In the case of an IC card 100 of an ISO type, the terminal unit 103 has eight contacts (VCC, RST, CLS, RFU, GND, VPP, I/O, and RFU).

A communication control function and a command processing function known in the art in such an IC card 100 will be now described with reference to FIG. 18. When the IC card 100 is inserted into a R/W (a reader/writer, not shown) of the transaction apparatus such as a terminal, a hardware reset is first executed on the IC card 100, as shown at ① in FIG. 18. In practice, a reset signal is inputted from a reset terminal (an RST contact of the terminal unit 103 in FIG. 17) of the IC card so that the MPU 101 is reset.

When the hardware reset is executed, the IC card 100 notifies an ATR (Answer To Reset) in response to that from a communication control unit 104 to the R/W (refer to ② in FIG. 18). After that, the IC card 100 gets into a standby state where the IC card 100 waits for a reception of a command (a line interruptible state; refer to ③ in FIG. 18).

If receiving a command in this state (refer to ④ in FIG. 18), the IC card 100 gets into an interrupt disable state (a state in which the IC card 100 does not accept another command). The IC card 100 dispatches depending on the command received this time, and a command processing unit 105 performs a command process (refer to ⑤ in FIG. 18). After that, the IC card 100 notifies a response to the command to the R/W from the communication control unit 104 (refer to ⑥ in FIG. 18), then gets again into the standby state where the IC card 100 waits for a reception of a command (refer to ⑦ in FIG. 18).

Incidentally, an international standard by ISO in terms of an IC card is expected to be settled within 1995. For this, a system using an IC card has again aroused interest in recent years. A standard specification in terms of ways of using an IC card is now under investigation in many fields.

Concurrently, various ways of using the IC card are proposed with diversification and sophistication of users' demands. It is surmised that there are requirements for a system configuration enabling simultaneous accesses from plural applications to one IC card and establishment of a multi-application support function to realize such system configuration with an increase of the demands.

As having been described with reference to FIG. 18, the IC card 100 known in the art employs a synchronous half-duplex transmission system (a system in which, when the apparatus accepts a command in the standby state where the apparatus waits for a command, the apparatus does not accept another command until a process for the command is terminated and the apparatus returns to the standby state) as the communication control function. For this, the IC card 100 cannot receive a command in a state other than the standby state. If several commands occur asynchronously from several applications, the IC card 100 cannot comply with these commands. Moreover the function of the IC card 100 is insufficient to realize the multi-application support function.

Moreover, the IC card 100 known in the art is designed on the supposition that the IC card 100 receives an access from one application. In consequence, the IC card is provided with no exclusive function in an access control on files retained in the storage 102 of the IC card 100 to inhibit another access to a file while an access from an application is being accepted and the file is now in an open state.

In the case of accessing from several applications, if, while one application is accessing to an address on a file in the IC card 100, a demand for obtaining access to the same address occurs from the same application or anther application, there is a possibility of an occurrence of data conflict, as will be described later. To comply with this, the file access control requires an exclusive control function as described before. Since the IC card 100 known in the art does not have a support for the exclusive control function, the function of the IC card 100 is insufficient to realize the multi-application support function.

As described above, if a system in which accesses from several application occur is configured, the following problems arise since the IC card 100 has an insufficient function.

In a multi-application system, a command to the IC card 100 generally occurs asynchronously. There is, therefore, a case, for example, that the IC card 100 receives a command from an application A, then another application transmits a command to the IC card 100 while the IC card 100 is processing the former command, as shown in FIG. 19.

At this time, since the IC card 100 is in a line interrupt disable state as described before, the IC card 100 therefore ignores the command from the application B. As a result, the time of the application B runs out in a state where the application B is waiting for a response from the IC card 100.

If the time is out in a state where a response block is being waited, re-transmission of the command becomes necessary. In this case, the application B cannot discriminate whether the time-out occurs due to a hindrance on the side of the IC card 100 or the time-out occurs because the IC card 100 has ignored the command. To comply with this, it is possible that the applications A and B issue commands to the IC card 100 while watching states of other applications. If employing such a configuration, each of the applications A and B cannot process independently.

There is a case where, after the application A has altered data in a file of the IC card 100 from "C" to "D" in a state where the file is in an open state, the IC card 100 accepts a command to read the same address in the same file from the application B, as shown in FIG. 20, since the IC card 100 known in the art does not have an exclusive control function.

In such a case, the application B has read the data in consideration that the data "C" has been retained in that file, but the application B has actually notified the data "D" from the IC card 100 so that conflict has occurred in the data.

SUMMARY OF THE INVENTION

To overcome the above problem, an object of this invention is to provide a card storage medium to which simultaneous accesses from several applications are possible, and which can comply with diversification and sophistication users' demands.

The present invention therefore provides a card storage medium having a storage unit for retaining files therein, a communication control unit for controlling communications with the outside, and a file access control unit for performing a command process according to a command received by the communication control unit by controlling an access to a file in the storage unit comprising a command multiplex reception control unit for accepting on occasion a command received from the outside by the communication control unit, besides successively requiring the file access control unit to perform a command process according to the command accepted. The file access control unit comprises an access exclusive control unit for managing the files in the storage unit in predetermined file units, and if a file unit that is an object of a new command process required by the command multiplex reception control unit is already an object of another command process, the file access control unit inhibits the file unit for said new command process.

According to the card storage medium of this invention, reception of commands occurring asynchronously from the outside becomes possible, as described above. In addition, it is possible to realize an access exclusive control by means of the function of the access exclusive control unit so as to prevent an occurrence of data conflict or the like. As a result, it is possible to issue commands simultaneously from several applications to one card storage medium.

In consequence, the present invention may provide a card storage medium which can comply with a system in which multi-application is operated, in addition to a use with a single application as before, widen a system configuration, and meet certainly diversification and sophistication of users' demands.

BRIEF DESCRIPTION OF THE DRAWINGS

DESCRIPTION OF THE PREFERRED EMBODIMENT (a) Description of Aspect of the Invention FIG. 1 is a block diagram showing an aspect of this invention. A card storage medium 1 shown in FIG. 1 has a storage unit 2, a communication control unit 3 and a file access control unit 4. Here, the storage unit 2 retains files therein. The communication control unit 3 controls communication with the outside. The file access control unit 4 performs a command process according to a command received by the communication control unit 3 by controlling an access to the file in the storage unit 2.

Figure 1:
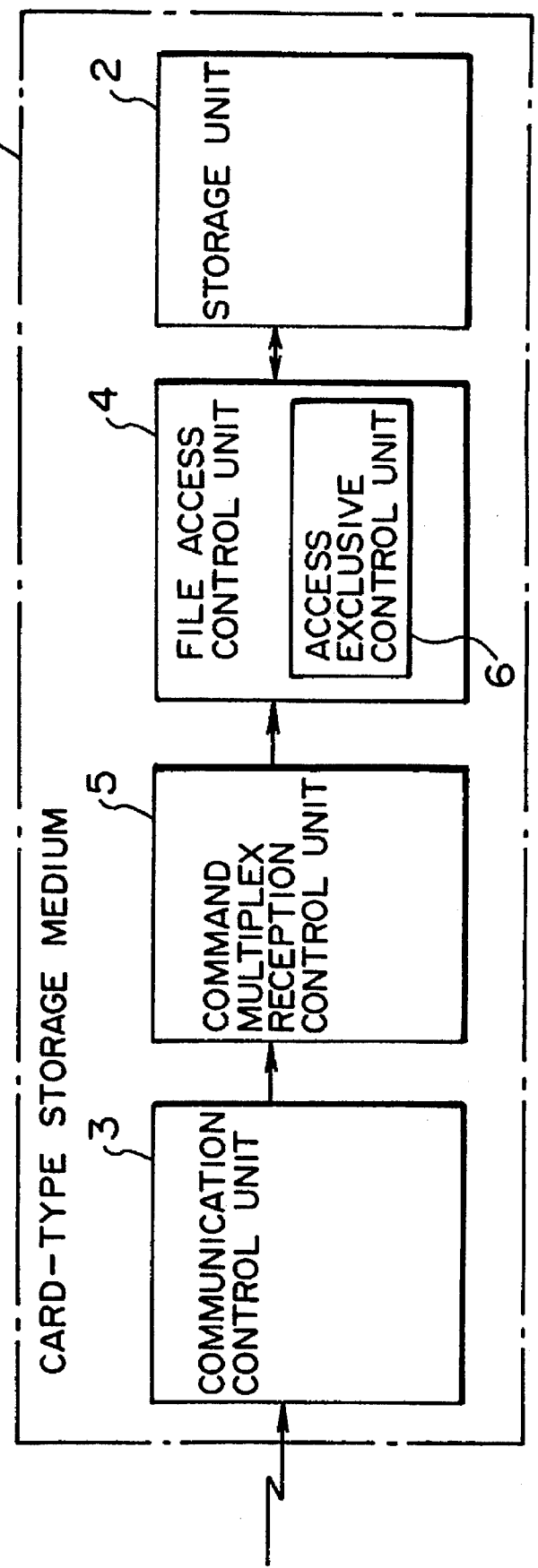
FIG. 1 is a block diagram showing an aspect of the present invention.

According to this invention, a command multiplex reception control unit 5 is provided. The command multiplex reception control unit 5 has a function to accept on occasion a command received from the outside by the communication control unit 3 and a function to successively require the file access control unit 5 to perform a command process according to the command accepted.

The file access control unit 4 has an access exclusive control unit 6. The access exclusive control unit 6 manages the files in the storage unit 2 in predetermined file units, and has a function for inhibiting an access to a file unit that is an object of a new command process required by the command multiplex reception control unit 5 if the file unit that is an object of the new command process is already an object of an access for another command process.

The command multiplex reception control unit 5 may be configured with a command queuing table, an interruption processing unit and a command dispatch processing unit. The command queuing table stores commands received from the outside therein. The interruption processing unit is activated by a command reception interruption when the communication control unit 3 receives a command from the outside, and accepts the command by queuing the command in the command queuing table. The command dispatch processing unit watches the command queuing table. If a command is queued in the command queuing table, the command dispatch processing unit reads the command, and requires the file access control unit 4 to perform a command process according to the command.

If a command accepted by the command multiplex reception control unit 5 is a file open command requiring that a predetermined file unit in the storage unit 2 be brought into an open state where the predetermined file unit is accessible from the file access control unit 4, a file name designating a predetermined file unit is set in advance as parameter information in the file open command. The card-type storage medium 1 is provided with an identifier generating unit for generating an identifier unique to a process on a predetermined file unit when the predetermined file unit is opened, and a notifying unit for notifying the identifier generated by the identifier generating unit to an issuer of the file open command. The access exclusive control unit 6 makes a file exclusive control information table which retains a file name which is the parameter information of a file open command and an identifier generated by the identifier generating unit as a pair therein, and performs an access exclusive control on each file unit while managing a file unit which is now in an open state by referring to the file exclusive control information table.

It is possible to set in advance an operation mode designating an operation in the event that the predetermined file unit is already in an open state as the parameter information in the file open command. If the operation mode is a wait mode, the file open command is again queued in the command queuing table and waits until the file unit is released. If the operation mode is a reject mode, the file open command is rejected and the effect that the file open command has been rejected is notified to an issuer of the file open command.

At this time, if the operation mode is the wait mode, it is possible to set a designated re-try number as the parameter information in the file open command. If the number of times of demands for a command process according to the same file open command made from the command multiplex reception control unit 5 on the file access control unit 4 exceeds the designated re-try number, the command process according to the file open command is terminated without being performed, and the effect of it is notified to an issuer of the file open command.

If the command accepted by the command multiplex reception control unit 5 is a file close command requiring that a file unit which is already opened be closed to terminate an access to the file unit, an identifier unique to a process on the file unit is set in advance as the parameter information in the file close command. The access exclusive control unit 6 deletes an entry whose identifier coincides with the identifier that is the parameter information of the file close command from the file exclusive control information to terminate an access exclusive control on the file unit.

If the command accepted by the command multiplex reception control unit 5 is a file access command requiring an access to a file unit which is already in an open state, an identifier having been notified upon a file opening is set in advance as the parameter information in the file access command. The file access control unit 4 confirms a presence of an entry having the identifier which is the parameter information of the file access command by referring to the file exclusive control information table made by the access exclusive control unit 6, after that, performs a command process according to the file access command.

In the card-type storage medium 1 of this invention having been described with reference to FIG. 1, the function of the command multiplex reception control unit 5 enables reception of commands from the outside occurring asynchronously. In addition to this, the function of the access exclusive control unit 6 realizes a so-called access exclusive control where simultaneous accesses by different commands to a file unit that is already an object of an access is inhibited if the card-type storage medium 1 performs a multiplex reception of commands as above so as to prevent an occurrence of data conflict or the like as having been described hereinbefore.

When the command multiplex reception control unit 5 receives a command from the outside, the command is successively stored in the command queuing table by the interrupt processing unit to be accepted, whereby the multiplex reception of commands is accomplished. The command dispatch processing unit watches and refers to any time the command queuing table, thereby enabling a dispatch process (a request for a command process by the file access control unit 4) of a command accepted.

When the command multiplex reception control unit 5 accepts a file open command to open a file unit that is an object according to the command, an identifier unique to a process on the file unit is generated and notified to an issuer of the command. At the same time, the access exclusive control unit 6 queues a file name and the identifier of the file unit having been opened as a pair in the file exclusive control information table. Accordingly, the access exclusive control unit 6 may manage a file unit that is now in an open state and perform an access exclusive control on each file unit when the file is opened by referring to the file exclusive control information table to confirm propriety of an access.

Further, if a file unit that is an object is in an open state (in use) when a file open command process is performed, it is possible to select a process thereafter with an operation mode set as the parameter information. If the operation mode is the wait mode, the file open command is again queued (re-entered) in the command queuing table so as to be waited and reexecuted. If the operation mode is the reject mode, the file open command is rejected and the effect of it is notified to an issuer of the file open command.

If the wait mode is selected as the operation mode and a file open command process is reperformed on the same file unit, there is a possibility of a deadlock where the file open command process cannot be performed and thereby producing a long wait. It is possible to avoid such deadlock by terminating the file open command when the number of repetitions of the same file open command process exceeds a predetermined number (the designated re-try number).

When the command multiplex reception control unit 5 accepts a file close command, the access exclusive control unit 6 deletes an entry whose identifier coincides with an identifier that is the parameter information of the file close command from the file exclusive control information table so that an access exclusive control on the file unit may be terminated.

When the command multiplex reception control unit 5 accepts a file access command, the file access control unit 4 refers to the file exclusive control information table to confirm whether an identifier which forms a pair with a file name that is an object of the file access coincides with an identifier which is the parameter information of the file access command or not so as to perform an access exclusive control on each file unit upon a file access.

According to the card-type storage medium 1 of this invention, the function of the command multiplex reception control unit 5 enables reception of commands from the outside occurring asynchronously. Besides, the function of the access exclusive control unit 6 realizes an access exclusive control so as to prevent an occurrence of data conflict or the like. It is therefore possible to issue simultaneously commands from several applications to one card-type storage medium 1.

Accordingly, the present invention may provide a card-type storage medium 1 which can comply with a system in which multi-application is operated, in addition to a use with a single application as before, widen a system configuration, and certainly meet diversification and sophistication of users' demands.

If a file unit that is an object is in an open state (in use) when a file open command process is performed, the operation mode set as the parameter information enables a selection of whether a process after that is waited or rejected, and thus realizes various countermeasures meeting a demand of the user or application.

At this time, if the operation is the wait mode in particular, by designating a re-try number, it is possible to avoid a deadlock state while the file open command is being accepted.

(b) Description of Embodiment of the Invention

Hereinafter, an embodiment of this invention will be described with reference to the drawings.

Figure 2:
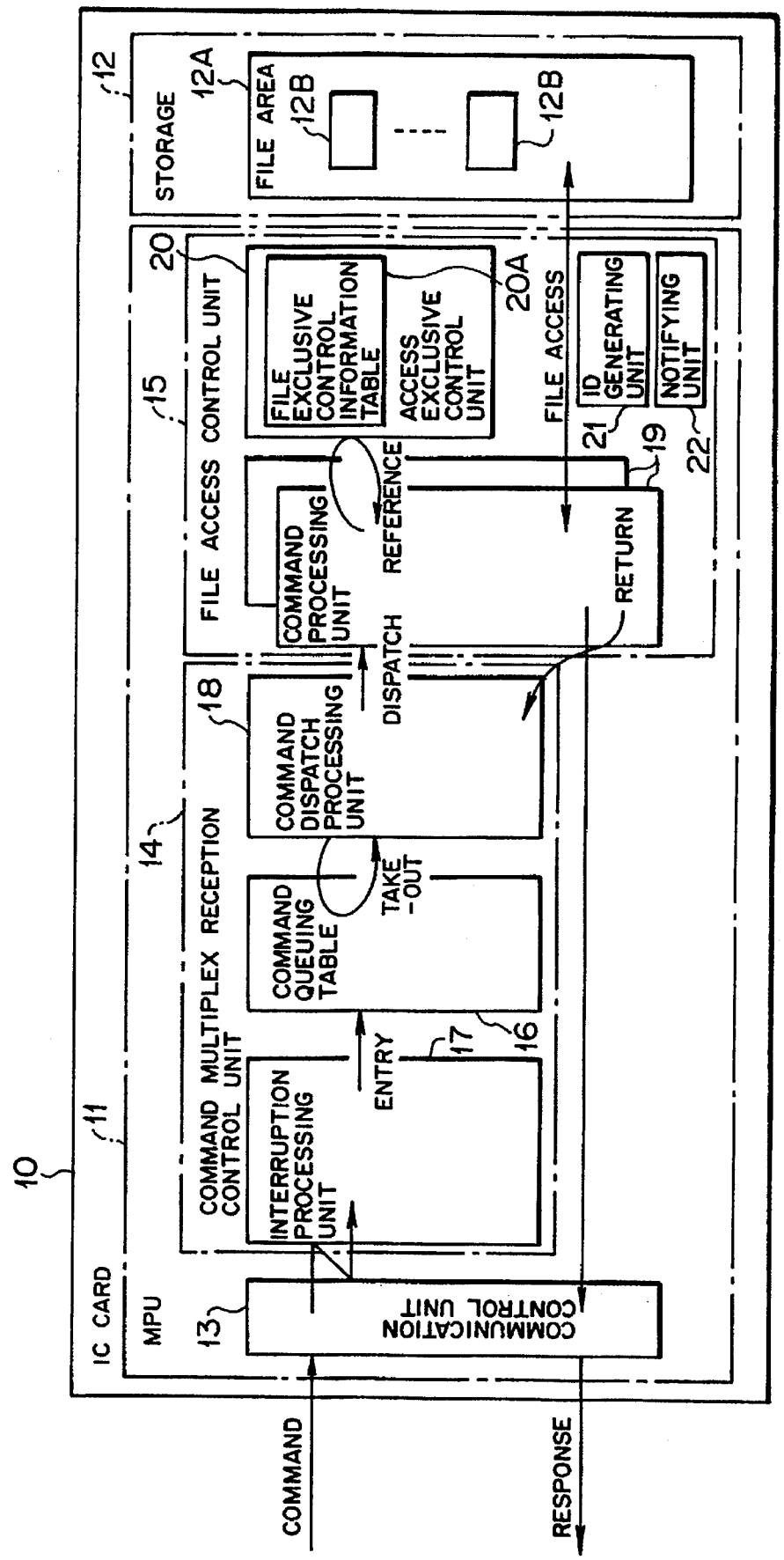
FIG. 2 is a block diagram of a card storage medium (an IC card) according to an embodiment of this invention.
Figure 16:
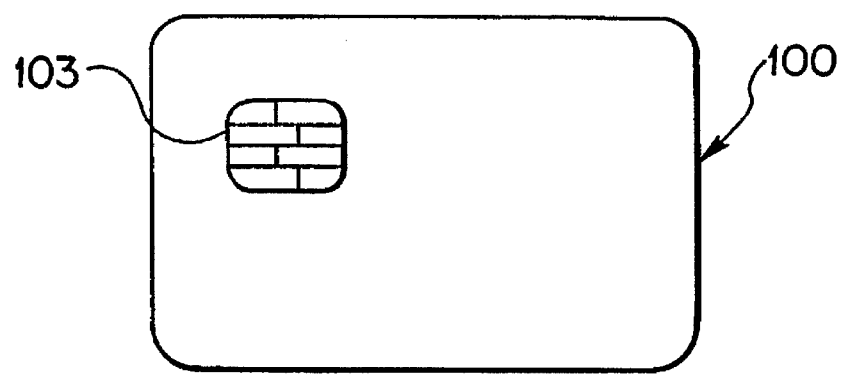
FIG. 16 is a plan view showing an external appearance of a general IC card.
Figure 17:
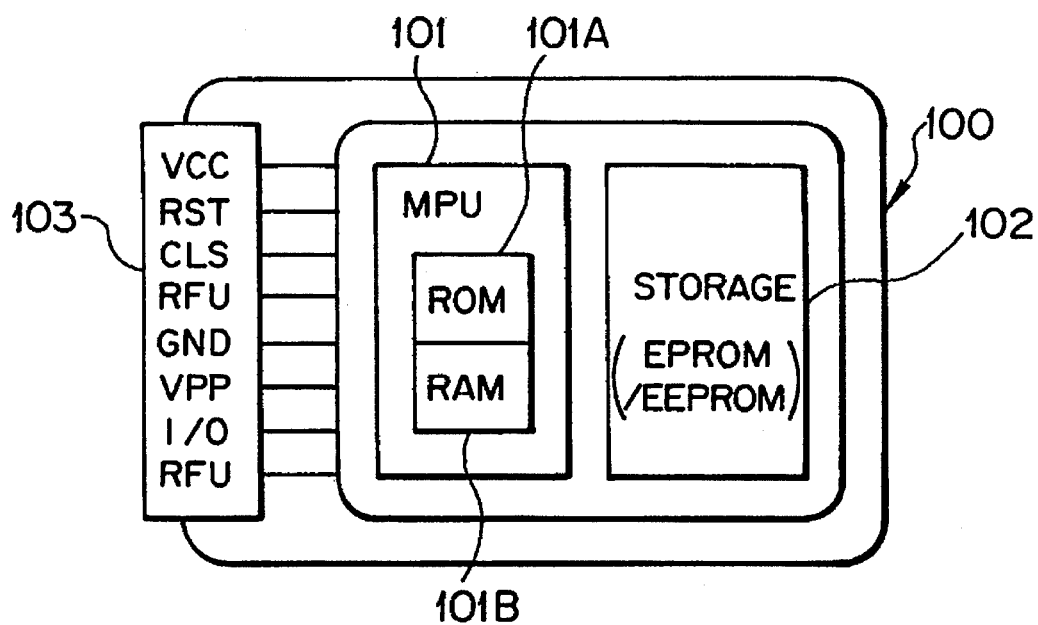
FIG. 17 is a block diagram showing a hardware structure of a general IC card.
Figure 18:
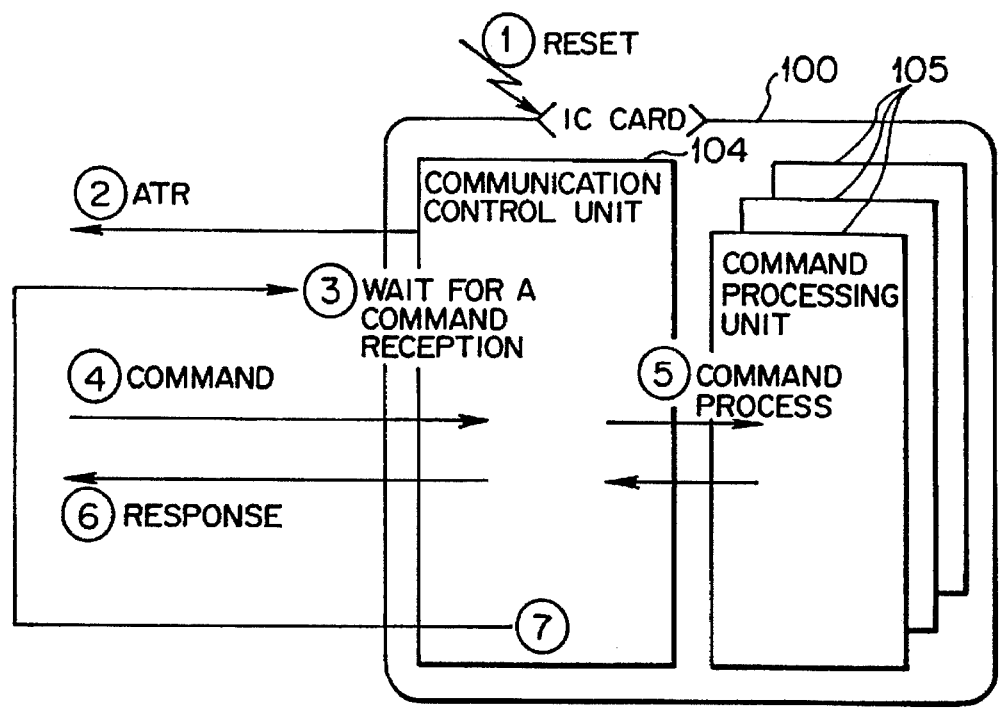
FIG. 18 illustrates a general communication control function and a general command process function of an IC card.
Figure 19:
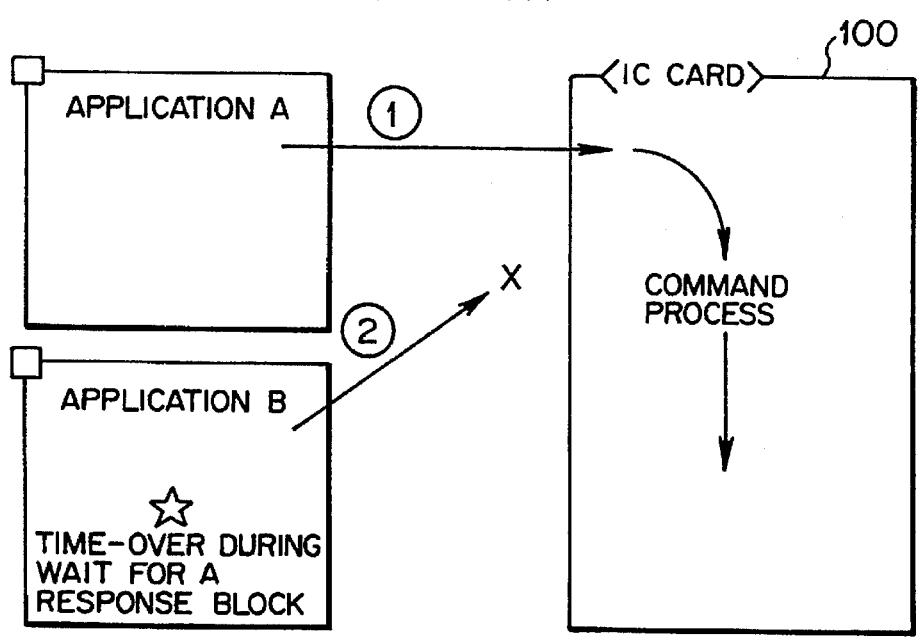
FIG. 19 illustrates a time-out while a response block is being waited occurring in a general IC card.
Figure 20:
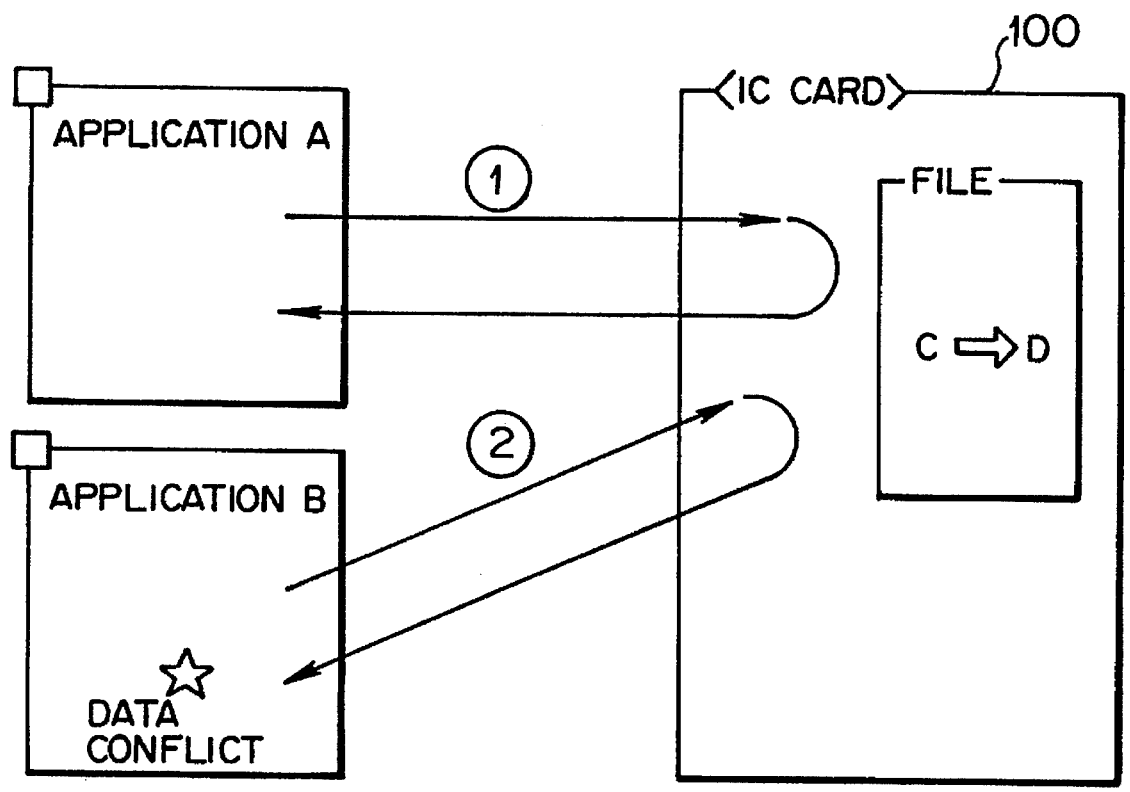
FIG. 20 illustrates data conflict occurring in a general IC card.

FIG. 2 is a block diagram showing a structure of a card-type storage medium (an IC card) according to an embodiment of this invention. In FIG. 2, reference numeral 10 denotes an IC card (a card-type storage medium). In the IC card 10, a microprocessor unit (MPU) 11 fulfilling various control functions described later and a storage (a file area; an EPROM/EEPRO, for example) 12 as a storage unit are built-in. The IC card 10 is inserted and connected to a R/W (a reader/writer) of an external apparatus (an upper apparatus, a transaction apparatus, a terminal apparatus), not shown, via the terminal unit (not shown in FIG. 2) having been described with reference to FIGS. 16 and 17.

The storage 12 has a file area 12A in which file units [DF (Dedicated file)/EF (Elementary File) in a hierarchical structure are retained. A file unit 12B in the file area 12A is managed by control information (a pointer, etc.) retained in a directory area, not shown, in the storage 12.

The MPU 11 is served to collectively manage the IC card 10. According to this embodiment, the MPU 11 has functions as a communication control unit 13, a command multiplex reception control unit 14 and a file access control unit 15.

The communication control unit 13 controls a communication with the outside (an application). The communication control unit 13 performs a process to receive a command from the external apparatus (a process to receive a transmission block) and a process to transmit a response (a process to form a transmission block) to the external apparatus from which the IC card 10 has received the command.

The command multiplex reception control unit 14 has a function to accept on occasion a command received from the outside and a function to successively require the file access control unit 15 to perform a command process according to the received command. As will be described later, the command multiplex reception control unit 14 is configured with a command queuing table 16, an interruption processing unit 17, and a command dispatch processing unit 18.

Figure 4:
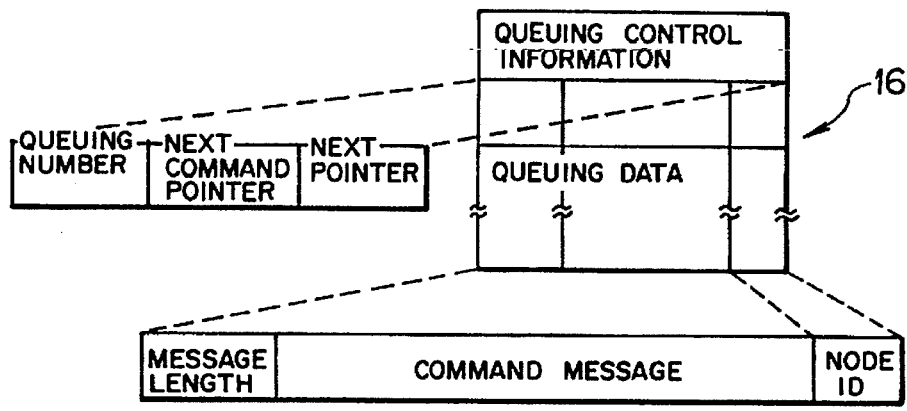
FIG. 4 illustrates contents of a queuing table according to the embodiment.

The command queuing table 16 stores a command received from the outside therein. In practice, the command queuing table 16 stores queuing control information and queuing data therein, as shown in FIG. 4.

As the command queuing control information, a queuing number that is the number of commands queuing in the command queuing table 16, a next command pointer showing a position in which a command process should be next performed, and a next pointer showing a position in which a command received next should be stored are retained.

The queuing data is data of a command itself that is queued. The queuing data is configured with a command message, a message length showing a length of the command message, and a node ID (an identifier) unique to each process, as described later, of each command.

The queuing number is updated whenever an interruption process, a command dispatch process or a file open process is performed, the next command pointer is updated whenever a command dispatch process is performed, and the next pointer is updated whenever an interruption process or a file open process is performed, as described later.

The interruption processing unit 17 operates according to a procedure described later with reference to FIG. 7. When receiving a command from the outside through the communication control unit 13, the interruption processing unit 17 is activated by an interrupt reception to accept the command by queuing the command in the command queuing table 16.

The command dispatch processing unit 18 operates according to a procedure described later with reference to FIG. 9. The command dispatch processing unit 18 watches at all times the queuing number in the command queuing table 16, successively reads commands if the commands are queuing in the command queuing table 16 (in the case where the command queuing number is equal to one or more), dispatches the commands to the command processing units 19 of the file access control unit 15, and requires the file access control units 15 (the command processing unit 19) to perform command processes according to the respective commands.

On the other hand, the file access control unit 15 operates according to a procedure described later with reference to FIGS. 11 through 14. The file access control unit 15 performs a command process according to a command received through the communication control unit 13 by controlling an access to the file area 12A of the storage 12. As will be described later, the file access control unit 15 is configured with several command processing units 19, an access exclusive control unit 20, a node ID generating unit 21 and a notifying unit Each of the command processing units 19 receives a command dispatched by the command dispatch processing unit 18 of the command multiplex reception control unit 14, and performs a process [a file open process, a file access process (a read access, a write access, etc.), a file close process] according to the command.

The access exclusive control unit 20 manages the file area 12A of the storage 12 in file units 12B. If a file unit 12B that is an object of a new command process required by the command multiplex reception control unit 14 (the command dispatch processing unit 18) is already an object of an access for another command process, the access exclusive control unit 20 functions to inhibit an access to the file unit 12B for the new command process.

When the command processing unit 19 opens a predetermined file unit 12B in a file open process, the node ID generating unit (an identifier generating unit) 21 generates a node ID (an identifier) unique to the process on the file unit 12B. There is no specific rule in a process to generate a node IC by the node ID generating unit 21. For instance, a function generating a psuedo-random number or the like (a function generating a number dynamically and at random) is used, and the generated psuedo-random number is used as a node ID.

The notifying unit 22 has notifies a node ID generated by the node ID generating unit 21 to an application that is a issuer of a file open command via the communication control unit 13. In addition to this, the notifying unit 22 has another function to make a double open error notice, a file unopen notice, a re-try over notice, etc. to an application that is an issuer of a command via the communication control unit 13, as will be described later with reference to FIGS. 11 through 14.

The node ID notified to the application by the notifying unit 22 is added as parameter information to a command whenever the same application issues a command to the same file unit 12B. With this node ID, it is possible to discriminate whether or not an access (a command issue) is gotten from a right application.

Figure 5:
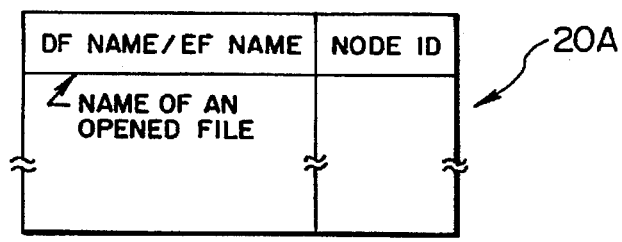
FIG. 5 illustrates contents of a file exclusive control information table according to the embodiment.

The access exclusive control unit 20 in the file access control unit 15 makes a file exclusive control information table 20A and retains it therein, and performs an access exclusive control on each of the file units 12B while managing a file unit 12B that is now in an open state. The file exclusive control information table 20A retains, for example, information about a file unit 12B having been already opened, that is, file exclusive control information made up of a pair of a file name (a DF name/an EF name) designated with a file open command and a node ID generated by the node ID generating unit 21, as shown in FIG. 5.

According to this embodiment, a file name (a DF name/an EF name) designating a file unit 12B that should be opened and an operation mode designating an operation in the event that the designated file unit 12B has been already opened are set in advance in a file open command (a command requiring that a file unit 12B in the storage 12 that should be opened be brought into an open state where the file unit 12B is accessible from the file access control unit 15), besides a designated re-try number in the event that the operation mode is a wait mode and is set in advance therein as parameter information, as needed.

If the file unit 12B designated is already in an open state upon a file open process, a file open command is again queued in the command queuing table 16 if the operation mode set in the file open command is the wait mode, and waits until the designated file unit 12B is released. If the operation mode is a reject mode, the file open command is rejected, and the effect that the file open command has been rejected is notified to an application that is an issuer of the file open command through the communication control unit 13 by the notifying unit 22. A detailed description of the above file open process will be described later with reference to FIG. 11.

Figure 6:
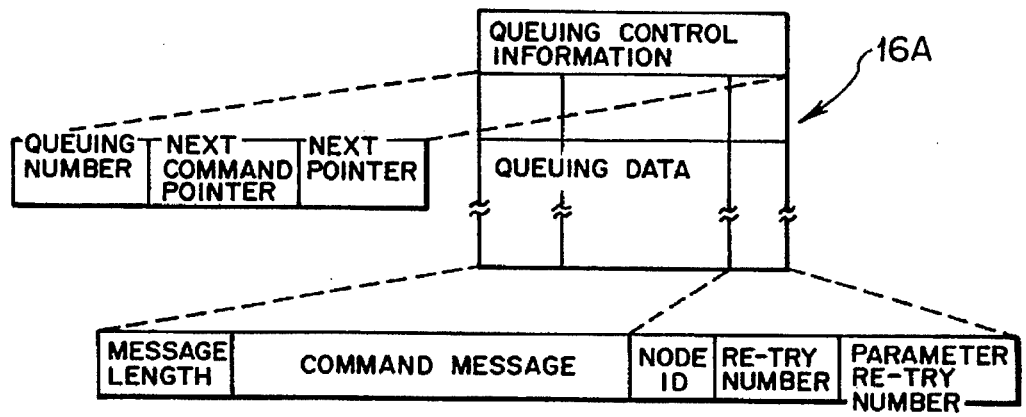
FIG. 6 illustrates a modification of the contents of the file exclusive control information table according to this embodiment.

If the above designated re-try number is set in advance as the parameter information in the file open command on this occasion, a re-try number and a parameter re-try number (the above designated re-try number) are added and retained as queuing data of the command queuing table 16A, as shown in FIG. 6. The information retained in the command queuing table 16A shown in FIG. 6 are quite the same as those retained in the command queuing table 16 having been described with reference to FIG. 4 except for the above re-try number and the parameter re-try number.

In terms of a file open command in which a designated re-try number is set, the file open command is again queued in the command queuing table 16 with the re-try number being updated whenever a reprocess demand is made. When the re-try number exceeds the parameter re-try number, the command process according to the file open command is terminated without being executed, and the effect of it is notified to an application that is an issuer of the file open command through the communication control unit 13 by the notifying unit 22. A detailed description of the above file ppen process will be described later with reference to FIG. 12.

In a file close command (a command requiring a close of a file unit 12B that is now in an open state and a termination of an access to the file unit 12B), a file name (a DF name/an EF name) designating a file unit 12B that should be closed and a node ID of a process unique to the file unit 12B are set in advance as the parameter information.

When receiving a file close command, the access exclusive control unit 20 of the file access control unit 15 deletes an entry whose node ID coincides with a node ID that is the parameter information of the file close command from the file exclusive information table 20A to terminate an access exclusive control on the file unit 12B. A detailed description of the above file close process will be described later with reference to FIG. 13. At this time, it is possible to delete an entry whose file name and node ID coincide with a file name (a DF name/an EF name) and a node ID that are the parameter information of the file close command, respectively.

Incidentally, the above file open command and the file close command are used as an exclusive access control command for operating the file exclusive control information in the file exclusive control information table 20A, as having been described before in this embodiment.

In the file access command (a command requiring an access to a file unit 12B that is already opened), a node ID having been notified to the application by the notifying unit 22 when the file was opened is set in advance as the parameter information. In addition, an access information [a type of access (read, write, etc.), a record number, etc.] is also set in advance as the parameter information in the file access command.

When receiving a file access command, the command processing unit 19 of the file access control unit 15 refers to the file exclusive control information table 20A made by the access exclusive control unit 20 to confirm a presence of an entry having a node ID that is the parameter information of the file access command (whether the node ID is queued in the table 20A or not), after that, performs a command process according to the file access command. A detailed description of the above file access process will be described later with reference to FIG. 14.

Figure 3:
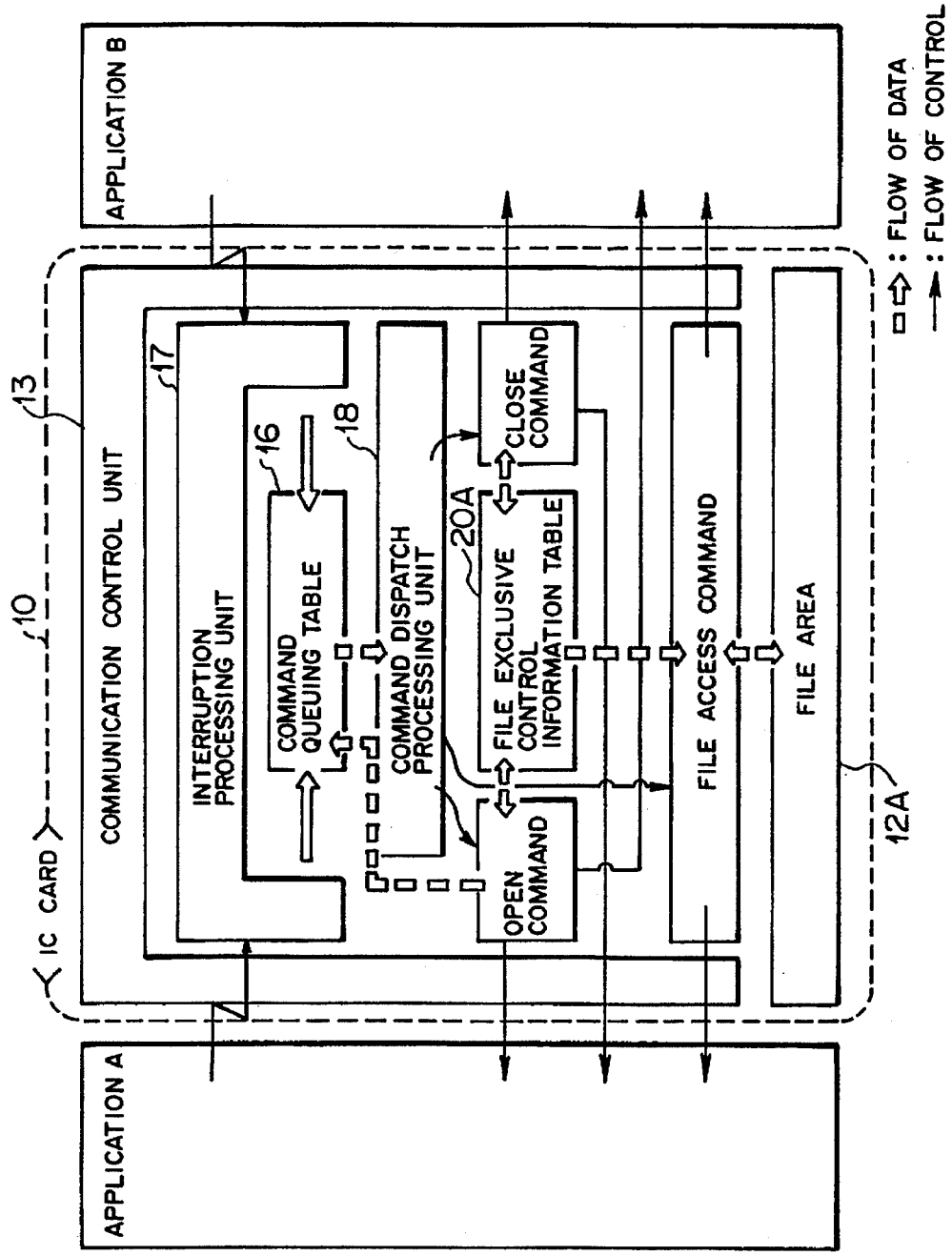
FIG. 3 is a functional block diagram of the card storage medium (the IC card) according to the embodiment.

FIG. 3 is a functional block diagram showing the card-type storage medium (an IC card) according to this embodiment, in which the same reference numbers having been described with reference to FIG. 2 designate like or corresponding parts. FIG. 3 functionally shows a state where two applications A and B get access simultaneously to the IC card 10, in which two kinds of arrows indicate a flow of data and a flow of control at that time, respectively.

Now, an operation of the IC card 10 as the card-type storage medium with the above structure according to this embodiment will be described with reference to FIGS. 7 through 15.

To begin with, an operation of the interruption processing unit 17 will be described with reference to a flowchart (Steps S1 through S5) shown in FIG. 7.

When activated by a command reception interruption from the communication control unit 13, the interruption processing unit 17 switches an interruptible state to an interrupt disable state (Step S1), then stores a command received by the communication control unit 13 as queuing data in an entry (an address) indicated by a next pointer in the queuing control information of the command queuing table 16 (Step S2).

After that, the interrupt processing unit 17 updates the next pointer in the queuing control information by one entry (Step S3), updates (adds one) the queuing number in the queuing control information (Step S4), switches again to the interruptible state, terminates the interruption process, and returns to an address which was being executed when the command reception interruption occurred.

Figure 7:
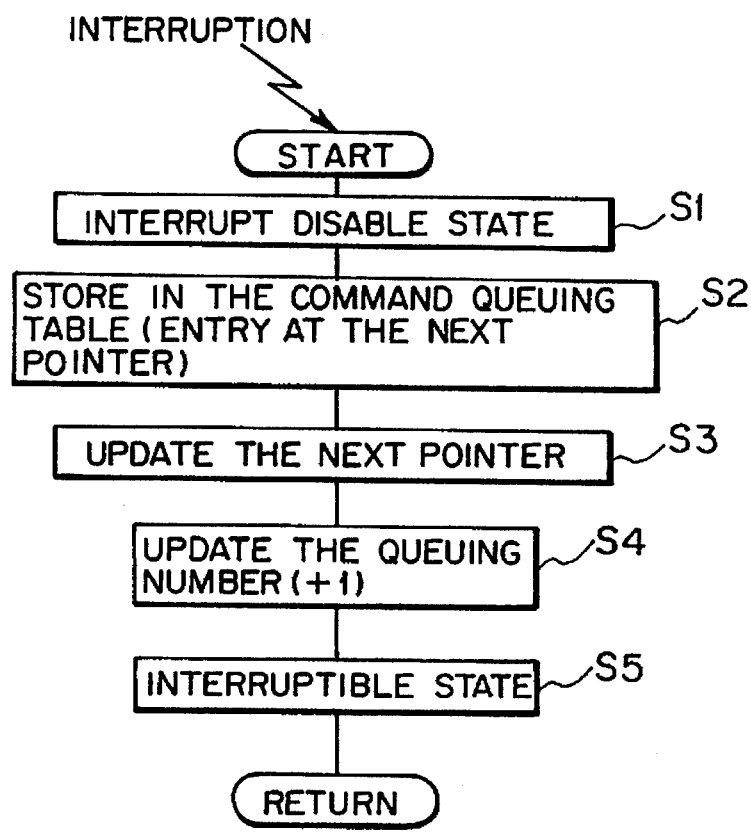
FIG. 7 is a flowchart for illustrating a procedure of an interruption process according to the embodiment.
Figure 8:
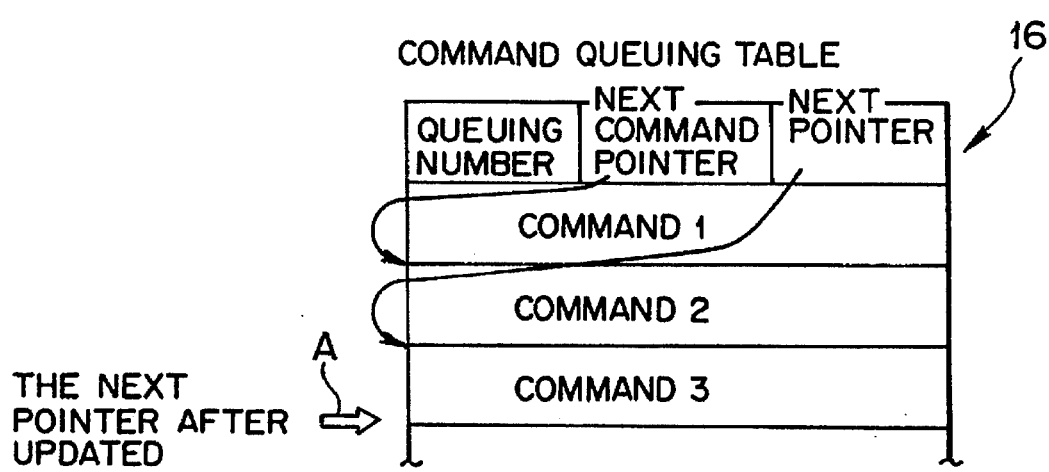
FIG. 8 illustrates a state of pointers in the command queuing table upon an interruption process.

At this time, for example, if a command 3 is stored in an entry indicated by the next pointer in the queuing control information of the command queuing table 16 as shown in FIG. 8, the next pointer is updated so as to indicate an entry indicated by an arrow A in the process at Step S3 in FIG. 7.

When receiving a command in the above interruption process, the interruption processing unit 17 once switches to the interrupt disable state, stores the command in the command queuing table 16 to accept the command, and immediately switches to an interruptible state. It is therefore possible to receive commands occurring asynchronously from several applications at any time.

Figure 9:
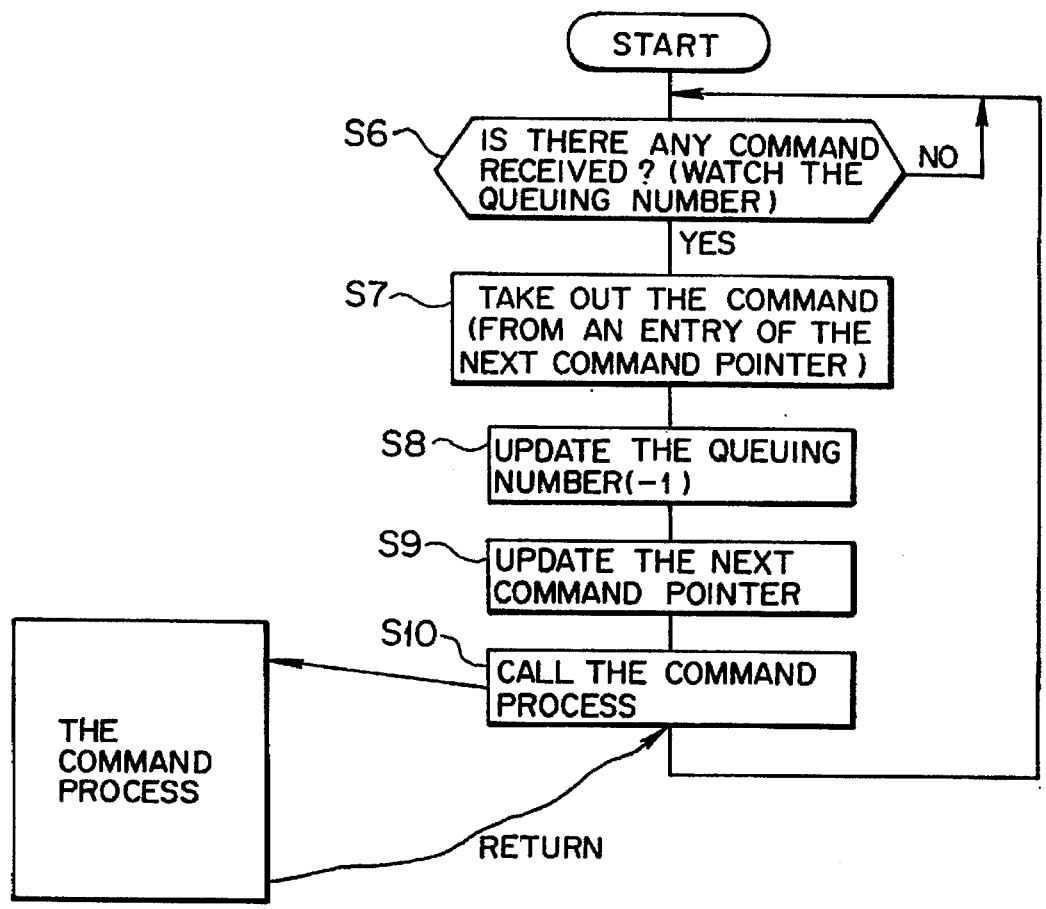
FIG. 9 is a flowchart for illustrating a procedure of a command dispatch process according to the embodiment.

FIG. 9 is a flowchart (Steps S6 though S10) for illustrating an operation of the command dispatch processing unit 18.

As shown in FIG. 9, the command dispatch unit 18 always watches the queuing number in the queuing control information of the command queuing table 16 (Step S6). If there is a received command (queuing data) in the command queuing table 16 (in the case of a YES judgement at Step S6), the command dispatch processing unit 18 takes out the command from an entry indicated by the next command pointer in the queuing control information (Step S7).

The command dispatch processing unit 18 updates (subtracts one) the above queuing number (Step S8) besides updating the next command pointer by one entry (Step S9), and calls a command process according to the command (Step S10). Namely, the command dispatch processing unit 18 dispatches a command process according to the command read out from the command queuing table 16 to the command processing unit 19 of the file access processing unit 15 to make a request or a demand, and waits return from the command process.

Figure 10:
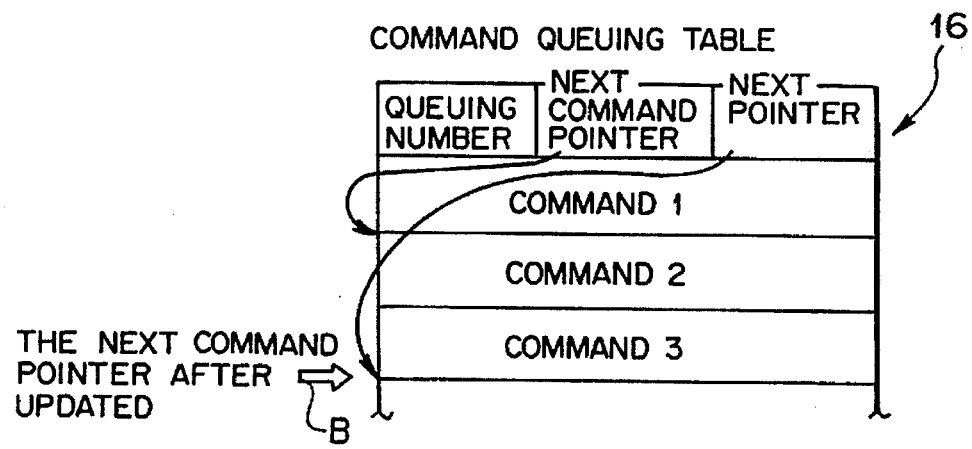
FIG. 10 illustrates a state of the pointers in the command queuing table upon a command dispatch process.

At this time, if the next command pointer in the queuing control information of the command queuing table 16 indicates, for example, a command 2 as shown in FIG. 10, the command 2 is taken out at Step S7 in FIG. 9. After that, the next pointer is so updated as to indicate an entry indicated by an arrow B, that is, a command 3, in a process at Step S9 in FIG. 9.

Next, procedures of various command processes performed by the file access control unit 15 will be described with reference to FIGS. 11 through 14, respectively.

Figure 11:
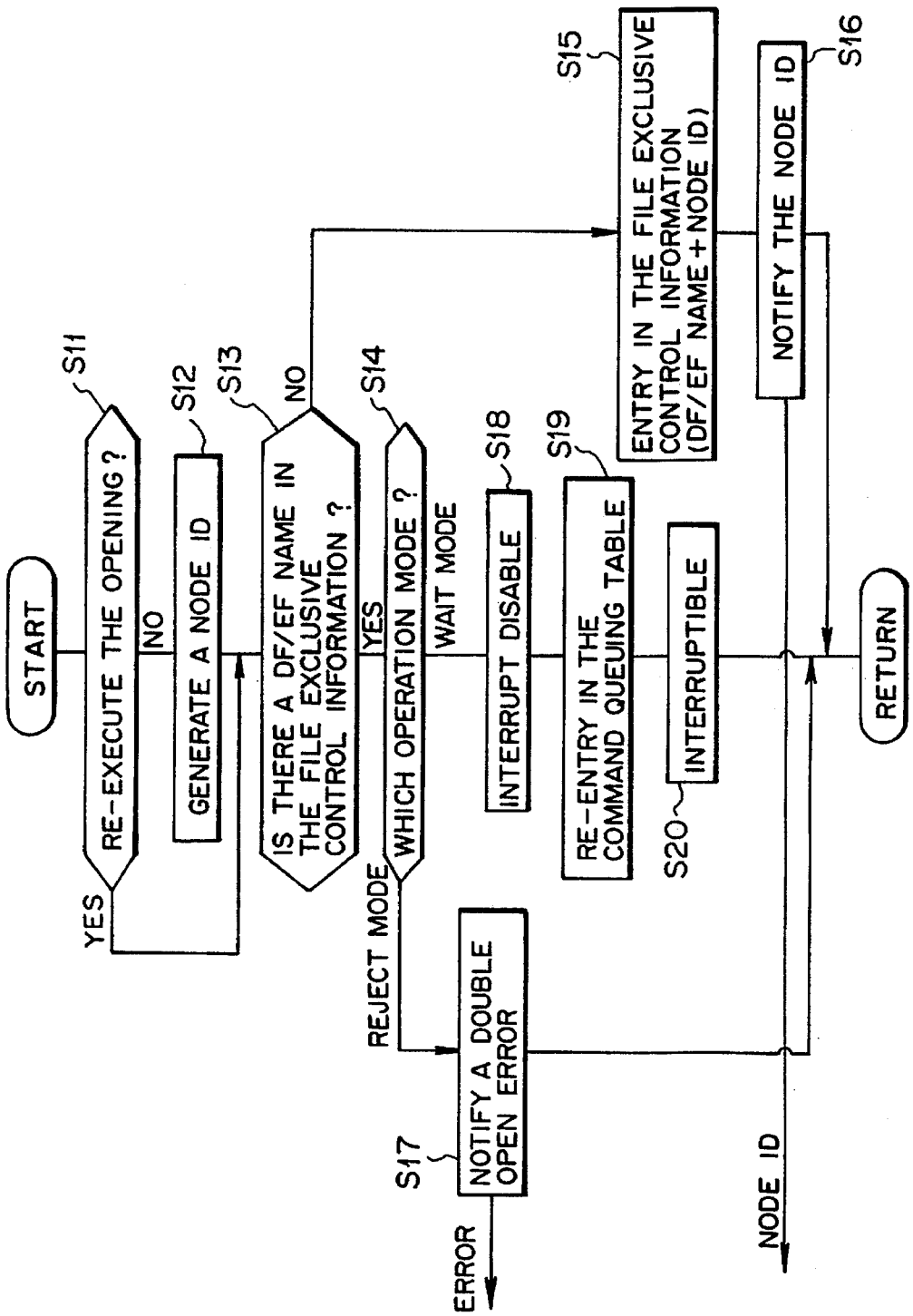
FIG. 11 is a flowchart for illustrating a procedure of a file open process according to the embodiment.

FIG. 11 is a flowchart showing a procedure of a file open process (Steps S11 through S20). As shown in FIG. 11, it is first confirmed upon a file open process whether a node ID has been already set in an entry (having a command message directing a file opening) taken out from the command queuing table 16 or not. If a node ID has not been set, it is judged that the command is a new file open command. Accordingly, the node ID generating unit 21 generates a node ID for the process (Step S12). If a node ID has been set, it is judged that the command requires a reexecution of the file open process, so a process at Step S12 is skipped.

Next, the file exclusive control information table 20A of the access exclusive control unit 20 is referred to, and a file name that is the parameter information of a file open command of this time is compares with an entry (a file name) of the file exclusive control information table 20A to confirm whether or not a file unit 12B that is an object of the file open process of this time has been entered in the file exclusive control information table 20A (Step S13).

If it is known from a result of the confirmation at Step S13 that the file unit 12B that is an object of the file open process of this time is not yet entered in the file exclusive control information 20A, a DF name/an EF name and a node ID of the file unit 12B are entered and queued as file exclusive control information in the file exclusive control information table 20A (Step S15), then the node ID is notified by means of functions of the notifying unit 22 and the communication control unit 13 to an external application which has requested the file opening (Step S16).

If an entry of the file unit 12B that is an object of the file open process of this time is ascertained at Step S13, it is judged in this embodiment whether an operation mode designated by the parameter information is the reject mode or the wait mode since the file unit 12B has been already opened and is now an object of an access for another command process (now in use by another node) (Step S14), so the following process is performed according to the operation mode.

If the reject mode is designated as the operation mode, a process of that file open command is rejected, and a file double open error is notified by means of the functions of the notifying unit 22 and the communication control unit 13 to the external application which has requested the file opening (Step S17).

If the wait mode is designated as the operation mode, the interruption processing unit 17 of the command multiplex reception control unit 14 inhibits an interruption (Step S18), enters again the file open command of this time in the command queuing table 16 (Step S19), and after that, cancels the inhibition of an interruption to permit an interruption (Step S20).

Incidentally, the re-entry of the command at Step S19 is performed in the same manner as the procedure having been described at Steps S2 through S4 in FIG. 7, where a node ID and a command message are queued, and the queuing number is updated (added one) along with the next pointer.

When any one of Steps S16, S17 and S20 is terminated, the process in the MPU 11 of the IC card 10 of this embodiment returns to the command dispatch process having been described with reference to FIG. 9.

If file open commands are issued to the same file unit 12B in multi-application, there is a possibility of falling into a deadlock state, as having been described before. To prevent this, it is possible according to this embodiment to add the designated re-try number (a parameter re-try number) as the parameter information if the operation mode designated as the parameter in the file open command is the wait mode, as having been described with reference to FIG. 6.

Figure 12:
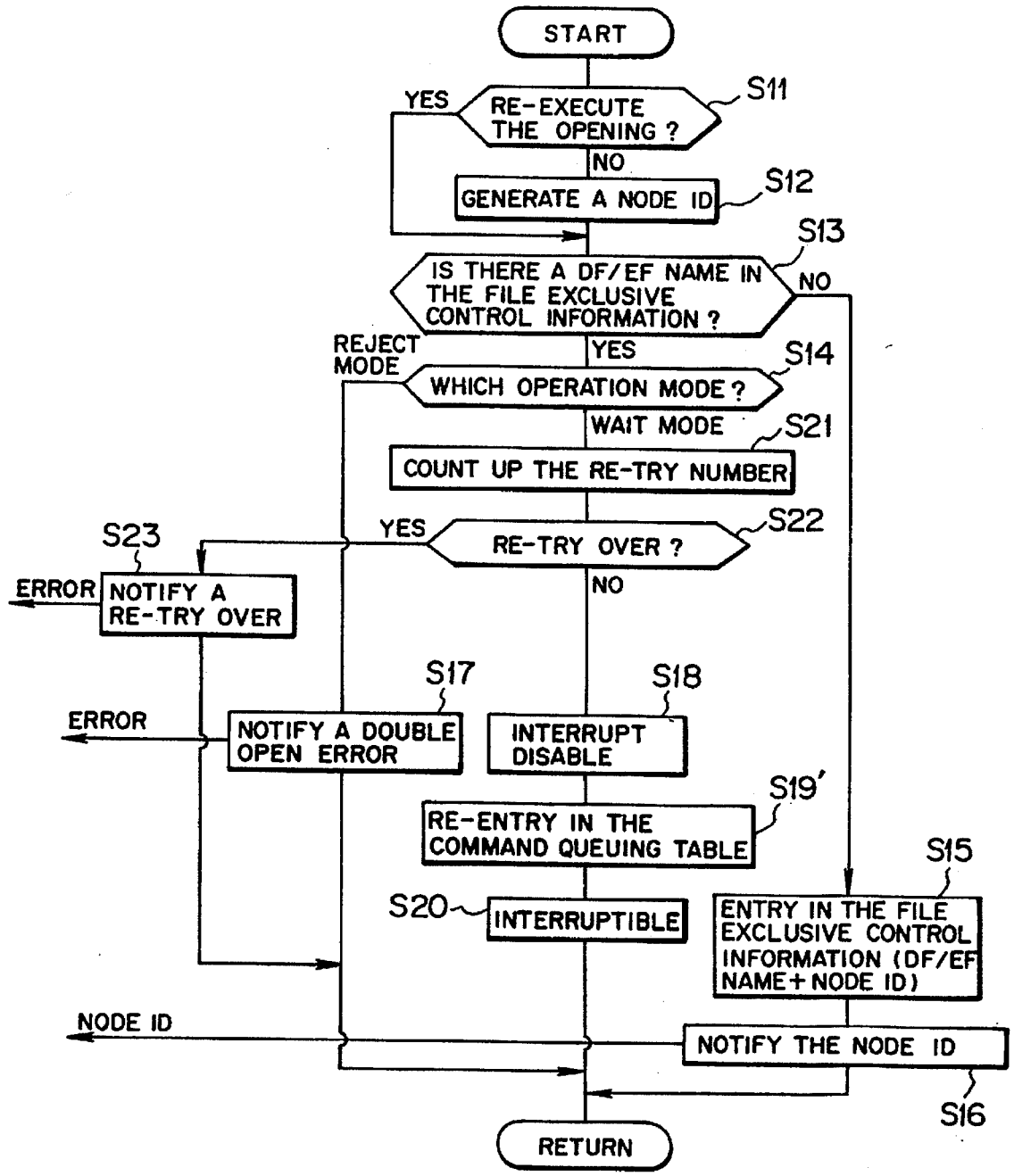
FIG. 12 is a flowchart for illustrating a procedure of a file open process according to this embodiment adding a deadlock protecting function thereto.

An operation of the file open process in the event that the IC card 10 has a deadlock preventing function will be next described with reference to a flowchart (Steps S11 through S23) shown in FIG. 12. As shown in FIG. 12, the basic operation is quite the same as the operation having been described with reference to FIG. 11. At steps among the steps in FIG. 12 indicated by the same step numbers in FIG.

11, the same processes are performed, whose descriptions are omitted here.

The processing operation in FIG. 12 differs from the processing operation in FIG. 11 in two points that two sorts of information that should be entered upon a process of a re-entry of a file open command in the command queuing table 16 (Step S19') are added and new Steps S21 through S23 are added.

Namely, as an operation in the process shown in FIG. 12, the number of actual re-tries (the number of times of execution of the file open command) and the parameter re-try number are entered along with a node ID and a command message, besides the queuing number (added one) and the next pointer are updated upon a re-entry process at Step S19' as shown in FIG. 6.

If the wait mode is designated as the operation mode, the above re-try number is counted up (added one) after the judgement at Step S14 (Step S21). After that, the re-try number after the count-up is compared with a designated re-try number designated by the parameter information (Step S22).

If it is judged as a result of the comparison that the re-try number exceeds the designated re-try number, in other words, if the file unit 12B that is an object of the file opening has not yet been released from another application (another node) although the file open command has been reexecuted for the designated re-try number, re-try-over is notified to an external application which has requested the file opening by mean of the functions of the notifying unit 22 and the communication control unit 13 (Step S23), and the process is terminated without an execution of the file open command process. After that, the process in the MPU 11 of the IC card 10 of this embodiment returns to the command dispatch process having been described with reference to FIG. 9. As noted above, it is possible to positively prevent a deadlock condition from occurring in the wait mode.

Figure 13:
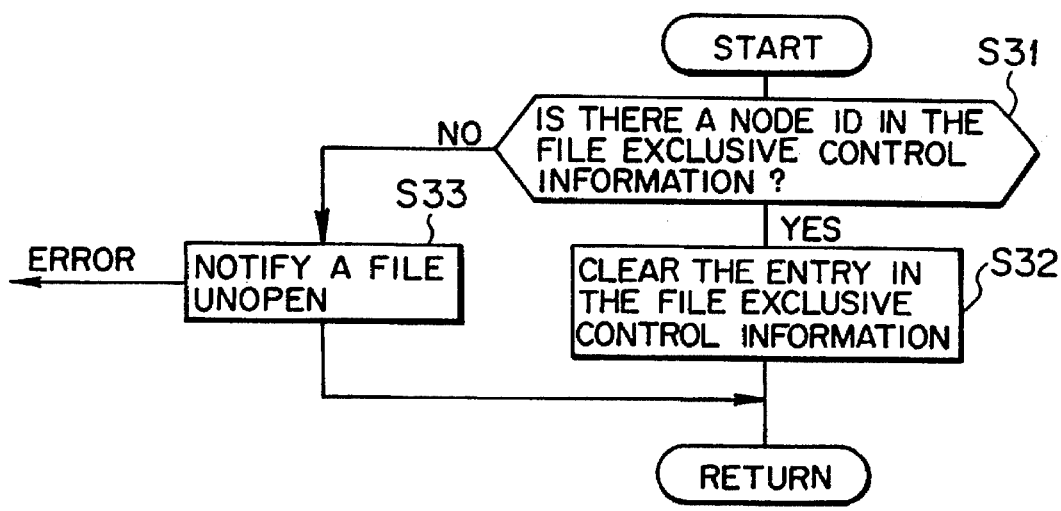
FIG. 13 is a flowchart for illustrating a procedure of a file closing process according to the embodiment.

FIG. 13 is a flowchart (Steps S31 through S33) showing a procedure of a file close process. As shown in FIG. 13, it is judged upon a file close process whether or not a node ID designated as the parameter information of a file close command is entered and queued in the file exclusive control information table 20A (Step S31).

If the node ID is queued (in the case of a YES judgement), an entry whose DF name/EF name and node ID that are the parameter information of the file close command coincide, respectively, is cleared from the file exclusive control information table 20A (Step S32) so that the access exclusive control unit 20 terminates an excess exclusive control on the file unit 12B and the file access control unit 15 terminates an access process on the file unit 12B.

If it is judged at Step S31 that the node ID is not queued (in the case of a NO judgement), the effect that the file unit 12B that is an object of the file closing has not yet been opened (file unopened) is notified as an error to an external application having requested a file opening by means of the functions of the notifying unit 22 and the communication control unit 13 (Step S33).

When any one of the above Steps S32 and S33 is terminated, the process in the MPU 11 of the IC card 10 of this embodiment returns to the command dispatch process having been described with reference to FIG. 9.

Figure 14:
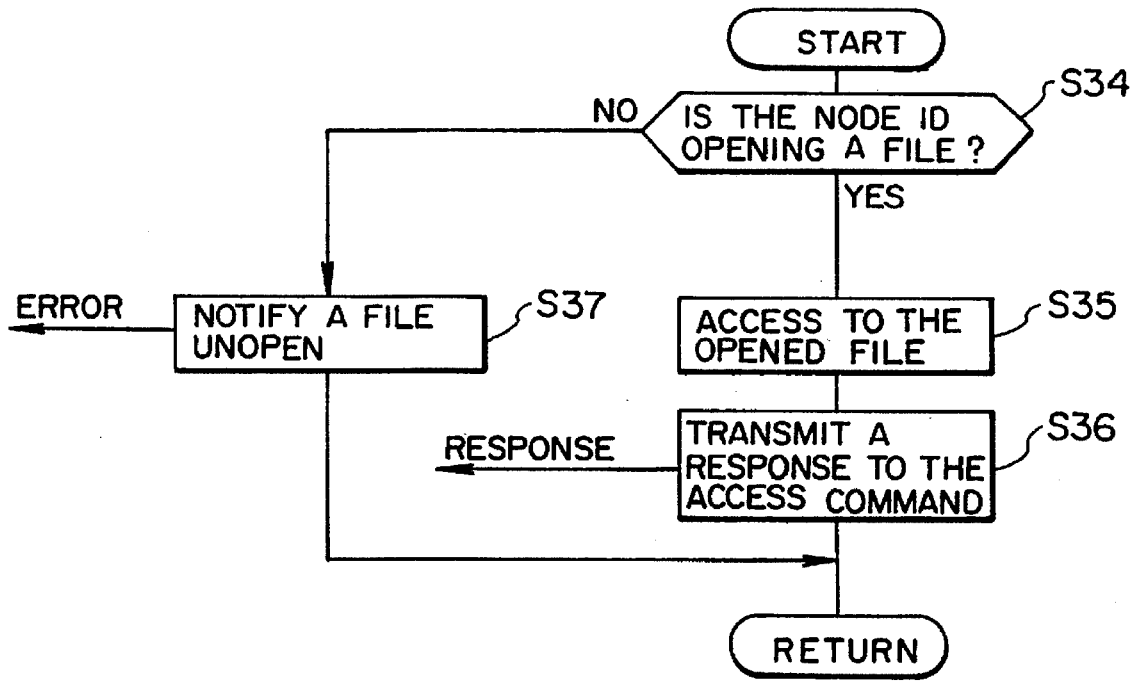
FIG. 14 is a flowchart for illustrating a procedure of a file access process according to the embodiment.

FIG. 14 is a flowchart (Steps S34 through S37) showing a procedure of a file access process. As shown in FIG. 14, the command processing unit 19 in the file access control unit 15 refers to the file exclusive control information table 20A upon the file access process to judge whether or not a node ID designated as the parameter information of a file access command is entered and queued in the file exclusive control information table 20A, in other words, whether or not a file unit 12B that is an object of the access is in an open state (Step S34).

If the node ID has been queued (a YES judgement), the command processing unit 19 gets an access according to access information (an access type, a record number, etc.) designated as the parameter information of the file access command to execute the command process on the file unit 12B that is an object of the access and has been already in the open state (Step S35). After that, a result of the process (a response to the file access command) is notified to an external application which has requested the file access from the communication control unit 13 (Step S36).

If it is judged at Step S34 that the node ID is not queued (in the case of a NO judgement), the effect that the file unit 12B that is an object of the file access has not yet been opened is notified to the external application which has requested the file opening by means of the functions of the notifying unit 22 and the communication control unit 13 (Step S37).

When any one of the above Steps S36 and S37 is terminated, the process in the MPU 11 of the IC card 10 of this embodiment returns to the command dispatch process having been described with reference to FIG. 9.

Hereinafter, a more practical example will be described with reference to FIG. 15, where a case that two applications A and B, for example, get accesses simultaneously to two file units 12B-1 and 12B-2 in the same IC card 10 is assumed.

Figure 15:
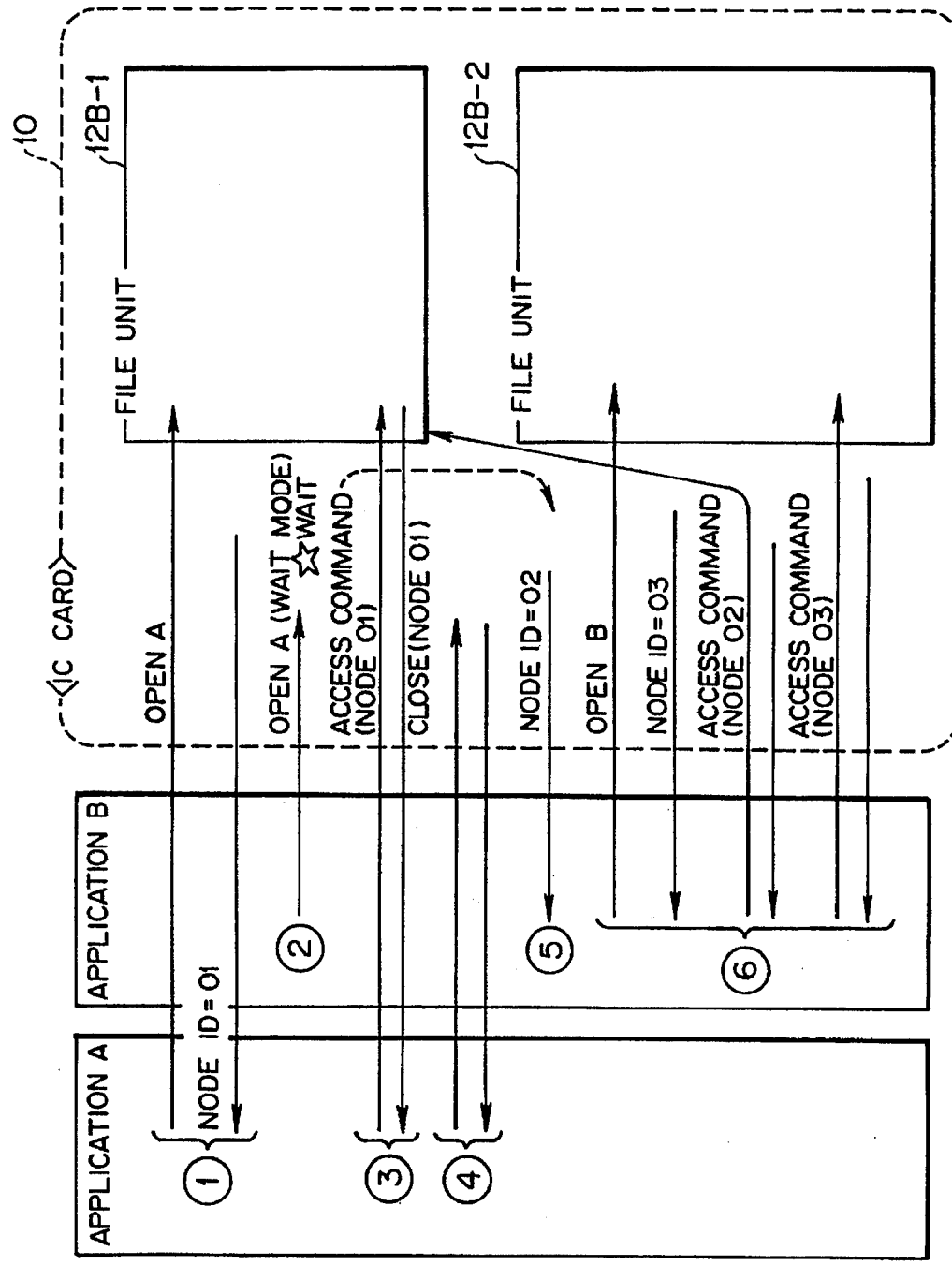
FIG. 15 shows a command sequence between an IC card and two applications in order to practically illustrate an operation of the embodiment.

As shown at ① in FIG. 15, the application A first issues a file open command Open A to the file unit 12B-1 in the IC card 10. When the file unit 12B-1 is opened, a node ID=01 is notified to the application A from the IC card 10.

Next, if the application B issues a file open command Open A to the file unit 12B-1 in the IC card 10 as shown at ② in FIG. 15, the file unit 12B-1 operates according to an operation mode designated by the parameter information of the file open command Open A in this case since the file unit 12B-1 has been already secured (opened) by the application A. The wait mode is designated here, so the file open command Open A from the application B waits until the file unit 12B-1 is released (an exclusive control).

Under such condition, if the application A issues a file access command (a node ID=01) to the file unit 12B-1 as shown at ③ in FIG. 15, the IC card 10 accepts normally the access command since the file unit 12B-1 has been opened with the node ID=01, and performs an access process according to the command.

When the application A issues a file close command Close having the node ID=01 as shown at ④ in FIG. 15, the file unit 12B-1 is released. Therefore, the file open command Open A for the file unit 12B-1 from the application B which is in a wait condition becomes executable. When the file open command is executed, a node ID=02 is notified from the IC card 10 to the application B as shown at ⑤ in FIG. 15.

After that, the application B performs an open/access process on the file units 12B-1 and 12B-2, as shown at ⑥ in FIG. 15. However, no command is used to the IC card 10 from the application A. Accordingly, there is no need to perform a file exclusive control, so the process is performed in a normal condition.

If a file open command Open B that should be issued to the file unit 12B-2 from the application B shown at 6 in FIG.

15 is issued to the file unit 12B-1 as the file open command Open A, the file unit 12B-1 shifts to an operation mode (the wait/reject mode) designated by the parameter information since the file unit 12B-1 is secured with the node ID=02 by the application B even if the command is from the same application B.

In this case, the same application B issues open commands separately to the same file 12B-1. As a result, a deadlock condition occurs. According to this embodiment, it is possible to avoid such a deadlock condition by designating the re-try number as the parameter information of the file open command, as having been described with reference to FIG. 12.

If the applications A and B try to get access to the same file unit 12B-1 having a deposit information, the application B cannot get a file access while the other application A is securing the file unit 12B-1 owing to the exclusive control as having been described before. It is therefore possible to prevent data conflict in, for example, the deposit from occurring.

According to the embodiment of this invention, it is possible that the command multiplex reception control unit 14 receives commands which occur asynchronously from several applications. In addition, the access exclusive control unit 20 enables an exclusive access from each of the applications (each node ID) so that an occurrence of data conflict or the like is prevented. It is therefore possible to issue simultaneously commands from several applications to one IC card 10

The embodiment of this invention may provide an IC card 10 which can be used not only with a single application as before but also comply with a system in which the multi-application is operated. This realizes a wider system configuration and positive measures to meet diversification and sophistication of users' demands.

As having described the embodiment where two applications simultaneously get accesses to one IC card 10, this invention is not limited to this example. The present invention may provide the same features and advantages as the above example if three or more applications access simultaneously to one IC card 10.

The above embodiment has been described by way of an example where the card-type storage medium is an IC card. This invention is not limited to this example, but applicable to another type of card-type storage medium such as an optical card, in which case, the present invention may provide the same features and advantages as the above embodiment.

What is claimed is:

1. A card storage medium having a storage unit for retaining files therein, a communication control unit for controlling communications with the outside, and a file access control unit for performing a command process according to a command received by said communication control unit by controlling an access to a file in said storage unit comprising:
    a command multiplex reception control unit for accepting on occasion a command received from the outside by said communication control unit, besides successively requiring said file access control unit to perform a command process according to the command accepted;
    said file access control unit comprising:
    an access exclusive control unit for managing the files in said storage unit in predetermined file units, and if a file unit that is an object of a new command process required by said command multiplex reception control unit is already an object of another command process, inhibiting access to said file unit for said new command process.

2. The card storage medium according to claim 1, wherein said command multiplex reception control unit comprises:
    a command queuing table for storing a command received from the outside therein;
    an interruption processing unit activated by a command reception interruption when receiving a command from the outside by said communication control unit for accepting said command by queuing said command in said command queuing table; and
    a command dispatch processing unit for watching said command queuing table, reading a command if said command is queued in said command queuing table, and requiring said file access control unit to perform a command process according to said command.

3. The card storage medium according to claim 2, wherein if a command accepted by said command multiplex reception control unit is a file open command requiring that a predetermined file unit in said storage unit be brought into an open state where said predetermined file unit is accessible from said file access control unit, a file name designating said predetermined file unit is set in advance in said file open command;
    said card storage medium further comprises:
    an identifier generating unit for generating an identifier unique to a process on said predetermined file unit when said file unit is opened; and
    a notifying unit for notifying said identifier generated by said identifier generating unit to an issuer of said file open command;
    said access exclusive control unit makes a file exclusive control information table for retaining a file name that is parameter information of said file open command and said identifier generated by said identifier generating unit as a pair therein, said access exclusive control unit performs an access exclusive control on each file unit while managing a file unit which is in an open state at present by referring to said file exclusive control information table.

4. The card storage medium according to claim 3, wherein if a command accepted by said command multiplex reception control unit is a file close command requiring that a file unit that is already in an open state be brought into a close state to terminate an access to said file unit, an identifier unique to the process on said file unit is set in advance as the parameter information in said file close command;
    said access exclusive control unit deletes an entry whose identifier coincides with an identifier that is the parameter information of said file close command from said file exclusive control information table to terminate an access exclusive control on said file unit.

5. The card storage medium according to claim 3, wherein if a command accepted by said command multiplex reception control unit is a file access command requiring an access to a file unit which is already in an open state, an identifier unique to a process on said file unit having been notified from said notifying unit upon a file opening is set in advance as the parameter information in said file access command;
    said file access control unit confirms a presence of an entry having the identifier which is the parameter information of said file access command by referring to said file exclusive control information table made by said access exclusive control unit, after that, performs a command process according to said file access command.

6. The card storage medium according to claim 2, wherein an operation mode designating an operation in the event that said predetermined file unit is already in an open state is set in advance as the parameter information;

if said operation mode is a wait mode, said file open command is again queued in said command queuing table and waits until said file unit is released;

if said operation mode is a reject mode, said file open command is rejected and the effect that said file open command has been rejected is notified to an issuer of said file open command.

7. The card storage medium according to claim 6, wherein a designated re-try number in the event that said operation mode is the wait mode is set in advance as the parameter information in said file open command;

if the number of times of demands for a command process according to the same file open command made from said command multiplex reception control unit on said file access control unit exceeds said designated re-try number in the event that said operation mode is the wait mode, said command process according to said file open command is terminated without being performed and the effect of it is notified to an issuer of said file open command.

8. The card storage medium according to claim 1, wherein if a command accepted by said command multiplex reception control unit is a file open command requiring that a predetermined file unit in said storage unit be brought into an open state where said predetermined file unit is accessible from said file access control unit, a file name designating said predetermined file unit is set in advance in said file open command;

said card-type storage medium further comprises:

an identifier generating unit for generating an identifier unique to a process on said predetermined file unit when said file unit is opened; and a notifying unit for notifying said identifier generated by said identifier generating unit to an issuer of said file open command;

said access exclusive control unit making a file exclusive control information table for retaining a file name that is parameter information of said file open command and said identifier generated by said identifier generating unit as a pair therein, said access exclusive control unit performs an access exclusive control on each file unit while managing a file unit which is in an open state at present by referring to said file exclusive control information table.

9. The card storage medium according to claim 8, wherein an operation mode designating an operation in the event that said predetermined file unit is already in an open state is set in advance as the parameter information;

if said operation mode is a wait mode, said file open command is again queued in said command queuing table and waits until said file unit is released;

if said operation mode is a reject mode, said file open command is rejected and the effect that said file open command has been rejected is notified to an issuer of said file open command.

10. The card storage medium according to claim 9, wherein a designated re-try number in the event that said operation mode is the wait mode is set in advance as the parameter information in said file open command;

if the number of times of demands for a command process according to the same file open command made from said command multiplex reception control unit on said file access control unit exceeds said designated re-try number in the event that said operation mode is the wait mode, said command process according to said file open command is terminated without being performed and the effect of it is notified to an issuer of said file open command.

11. The card storage medium according to claim 8, wherein if a command accepted by said command multiplex reception control unit is a file close command requiring that a file unit that is already in an open state be brought into a close state to terminate an access to said file unit, an identifier unique to the process on said file unit is set in advance as the parameter information in said file close command;

said access exclusive control unit deletes an entry whose identifier coincides with an identifier that is the parameter information of said file close command from said file exclusive control information table to terminate an access exclusive control on said file unit.

12. The card storage medium according to claim 8, wherein if a command accepted by said command multiplex reception control unit is a file access command requiring an access to a file unit which is already in an open state, an identifier unique to a process on said file unit having been notified from said notifying unit upon a file opening is set in advance as the parameter information in said file access command;

said file access control unit confirms a presence of an entry having the identifier which is the parameter information of said file access command by referring to said file exclusive control information table made by said access exclusive control unit, after that, performs a command process according to said file access command.

* * * * *